United States Patent
Das et al.

(10) Patent No.: US 7,528,704 B2
(45) Date of Patent: May 5, 2009

(54) METHOD AND DEVICE FOR PREVENTING INJURIES AND MATERIAL DAMAGE CAUSED BY MOTOR VEHICLE DOORS

(75) Inventors: Chandan Das, Deuerling (DE); Henryk Frenzel, Regensburg (DE); Christoph Hamann, Thalmassing (DE); Stephan Voltz, Happurg (DE); Ulrich Wagner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 736 days.

(21) Appl. No.: 10/545,881

(22) PCT Filed: Jan. 22, 2004

(86) PCT No.: PCT/EP2004/000528

§ 371 (c)(1),
(2), (4) Date: Oct. 14, 2005

(87) PCT Pub. No.: WO2004/071815

PCT Pub. Date: Aug. 26, 2004

(65) Prior Publication Data

US 2006/0254142 A1    Nov. 16, 2006

(30) Foreign Application Priority Data

Feb. 17, 2003 (DE) .................. 103 06 552
Mar. 19, 2003 (DE) .................. 103 12 252

(51) Int. Cl.
*B60Q 1/00* (2006.01)
(52) U.S. Cl. .............. 340/436; 340/435; 340/437; 340/438; 340/902; 49/26; 296/146.1

(58) Field of Classification Search ............ 340/436, 340/435, 437, 441, 457, 426.28, 902; 49/26, 49/27, 28, 31, 357; 296/146.1
See application file for complete search history.

(56) References Cited

U.S. PATENT DOCUMENTS 4,458,446 A    7/1984    Mochida et al.

(Continued)

FOREIGN PATENT DOCUMENTS

DE         36 22 091 A1    1/1988

(Continued)

*Primary Examiner*—Davetta W Goins
(74) *Attorney, Agent, or Firm*—Laurence A. Greenberg; Werner H. Stemer; Ralph E. Locher

(57) ABSTRACT

The invention relates to the prevention of injuries and material damage caused by doors (2) of stopped and/or parked motor vehicles (1) by means of at least one camera (4) which monitors the exterior (3) of, especially the space next to and/or above, the vehicle (1). According to the invention, a mode of operation monitoring the inner (7) and/or outer (8) door handle is activated and the exterior (3) of the motor vehicle (1) is monitored by means of the camera (4) if an evaluation unit (6) detects that a fixed or variable speed-related, acceleration-related, and/or distance-related threshold value (SW) is not met, e.g. when the vehicle (1) is stopped, or if said evaluation unit (6) detects that a signal unlocking the locking mechanism of the vehicle doors (2) is received while causing an acoustic, optical, and/or haptic warning signal to be issued as soon as a person actuates or unlocks optionally in an automated manner the vehicle door (2) handle (7, 8) even though a stationary (9) or approaching (10) object has been detected in the field of vision (5) of the camera (4).

72 Claims, 2 Drawing Sheets

U.S. PATENT DOCUMENTS

| | | |
|---|---|---|
| 6,205,710 B1 | 3/2001 | Busse |
| 6,362,735 B2 * | 3/2002 | Sicuranza .................. 340/556 |
| 6,676,186 B2 * | 1/2004 | Greif .......................... 296/50 |
| 7,193,509 B2 * | 3/2007 | Bartels et al. ............... 340/436 |

FOREIGN PATENT DOCUMENTS

| | | |
|---|---|---|
| DE | 195 26 452 C1 | 10/1996 |
| DE | 195 37 619 C2 | 4/1997 |
| DE | 198 36 310 A1 | 3/2000 |
| DE | 101 17 516 A1 | 10/2002 |
| FR | 2 783 547 | 3/2000 |
| JP | 60063480 A | 4/1985 |
| WO | 96/33079 | 10/1996 |

* cited by examiner

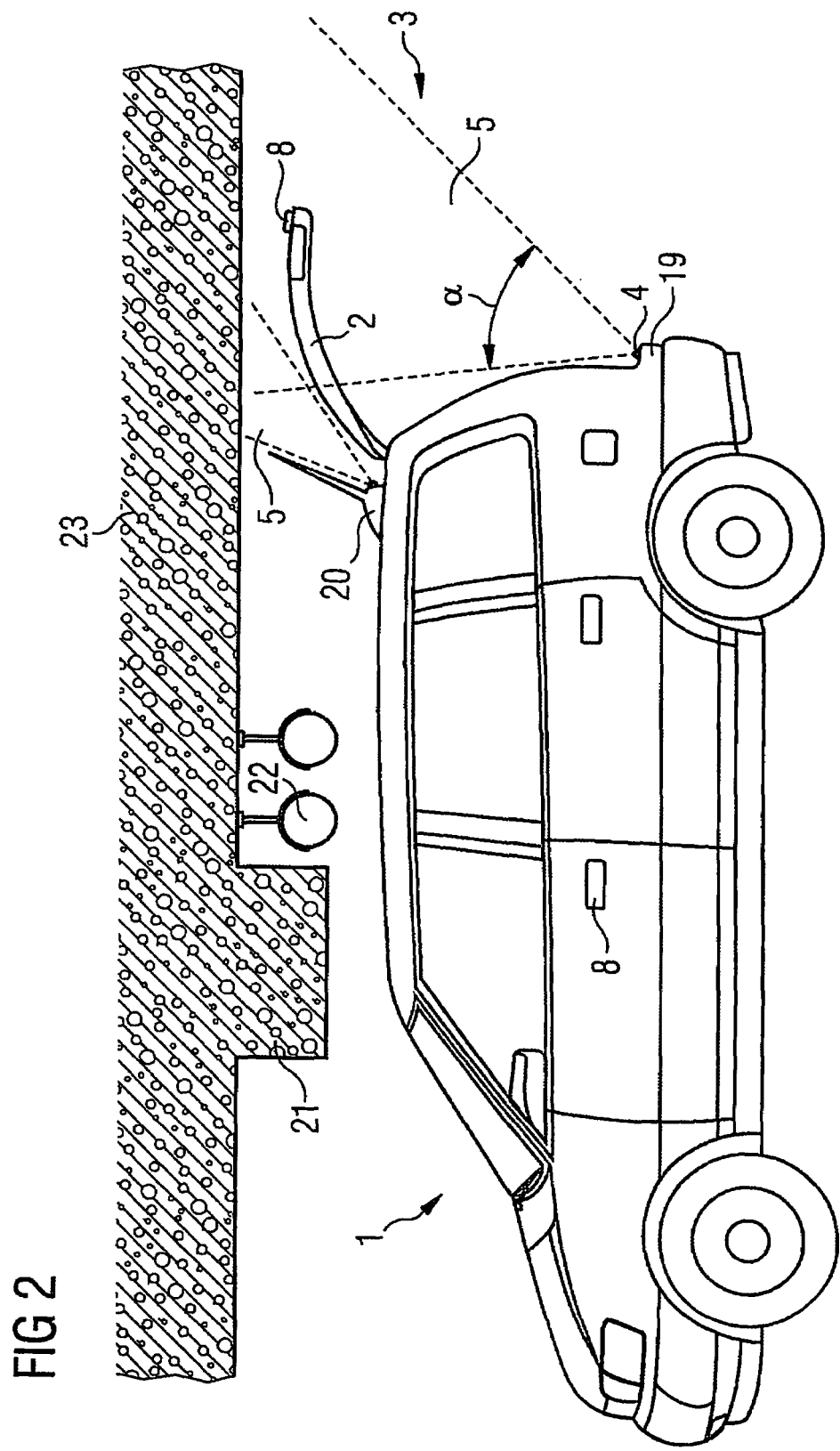

METHOD AND DEVICE FOR PREVENTING INJURIES AND MATERIAL DAMAGE CAUSED BY MOTOR VEHICLE DOORS

BACKGROUND OF THE INVENTION

Field of the Invention

The invention relates to a method and a device for preventing injuries and material damage caused by motor vehicle doors of stopped and/or parked vehicles with at least one monitoring unit that monitors the exterior.

There are situations in road traffic where the driver is overtaxed. For example, braking in a stream of traffic. If a driver is inattentive and a driver in front brakes, he will barely be able to stop in time. Accident investigators therefore call for sensors that react to brake lights before they are noticed by the driver.

There is a similar situation when changing lanes. If it is necessary to suddenly take avoiding action this happens so quickly that there is insufficient time for the usual glance in the rear-view mirror. Sensors can also help in this case and continuously keep the traffic area near to the car in focus, to provide a warning, before changing direction, of other hazards that have appeared.

There is a very real problem when an overtaking vehicle comes up so quickly that the driver hardly has a chance to see it. It disappears from his view in the blind spot alongside his vehicle. On passenger cars, this can be compensated for by regularly glancing in the interior rear-view mirror, but this is not possible in the case of trucks with a box body.

To avoid the aforementioned problems, the fitting of, for example, a micro camera in the left wing mirror to monitor the blind spot is known. If the driver selects the left indicator light or if he moves into the adjacent lane without indicating, he receives a visual and/or acoustic warning if there is another vehicle in this area that cannot be objectively viewed.

Whereas in the prior art there are sufficient proposed solutions to be found for such problems in conjunction with moving vehicles, the potential danger from stopped or parked vehicles has not as yet been considered. Whereas a vehicle that is stopping or stopped usually still has an occupant, a parked vehicle in the following is defined as one without occupants that is properly locked.

Accidents frequently occur when occupants are alighting from the vehicle, particularly if doors are carelessly opened with which other vehicles or cyclists then collide. This can cause serious injuries, particularly to cyclists if they are thrown over the vehicle door on to the road, the sidewalk or cycle path and, as is generally known, have no passive protective system.

Therefore, the road traffic acts of most European countries have a regulation prohibiting opening or leaving open vehicle doors in such a way that other road users can be endangered or impeded. A rule that is learned in the driving school ought to be actually observed. Unfortunately this is not the case, as shown by the many accidents caused precisely by disregard of this rule.

This rule is not just directed to the vehicle driver but to anyone who opens a vehicle door, i.e. including the front passenger and all other vehicle occupants stepping or jumping out of the vehicle, as the occupant himself can suffer serious injury due to a passing cyclist, motor vehicle or similar. This rule is also directed not least to persons who are assisting those boarding or alighting and open the doors, or hold them open, from the outside. Furthermore, the rule applies both to opening the doors both on the offside and curbside of a stopping, stopped or parked vehicle, regardless of whether it is an electrically operated gullwing or sliding door, because pedestrians are also road users that can suffer injury due to the careless opening of a vehicle door or by persons alighting or children jumping out etc.

What already applies to the opening of vehicle doors of any kind by persons applies all the more to automatic mechanisms for opening vehicle doors regardless of whether they are trunk lids, tailgates, gullwing doors or sliding doors. Mechanisms of this kind are being introduced not only as special equipment, e.g. for handicapped persons, but also increasingly in standard production vehicles.

To avoid such personal injuries, obstacles such as bollards, boundary blocks or similar are arranged next to the zones designated as parking or stopping areas, and because they are sometimes low they cannot always be seen through the side window. This sometimes leads to irritating paint and/or panel damage to the vehicle when the door is opened, if it sometimes violently strikes such obstacles, which is sometimes almost impossible to avoid if the ground slopes in that area.

Similar problems occur with mechanical and/or modern motorized unlocking or opening of a tailgate-type vehicle door of a vehicle in underground garages, particularly in unfamiliar parking lots or shopping malls. Variations in headroom due to ceiling joists, support beams, supply pipes routed along the ceiling or similar are frequently very difficult to determine or their distance poorly calculated, particularly in the frequently poor lighting conditions, so that it is not unusual for tailgates opened by gas damper assistance or similar to impact heavily on such obstacles and suffer damage.

SUMMARY OF THE INVENTION

The object of this invention is to avoid the aforementioned disadvantages. In particular, a method and a device for avoiding injury and material damage caused by vehicle doors of stopped or parked vehicles are to be provided.

This object is achieved in accordance with the invention by the features of the independent patent claims.

Advantageous embodiments and developments that can be used either individually or in combination with each other are the object of dependent claims.

The invention for the prevention of injuries and material damage caused by vehicle doors of stopped vehicles includes at least one monitoring unit that monitors the external space, particularly next to the vehicle, as well as an evaluation unit for the data obtained by the monitoring unit. If a fixed or variable threshold of value (SW) detected by the evaluation unit is undershot or if the evaluation unit detects a signal unlocking the locking mechanism of the vehicle door, an operating mode monitoring the inside door handle of the vehicle door is activated and a warning signal is output, immediately an occupant and/or a corresponding device (preferably operated mechanically, electrically and/or by motor, particularly an electric motor) actuates and/or unlocks the inside door handle of the vehicle door, even though an object that is essentially stationary or approaching is detected in the area monitored by the monitoring unit. Fixed objects to be detected by the monitoring unit if a passenger is to be protected against suffering a sprain or just wet feet are particularly bollards, boundary blocks, edges of curbstones or similar, as well as uneven areas or puddles. The aforementioned invention, therefore, has the advantage that the danger of injuries or material damage by the careless opening of a vehicle door from inside by a person is minimized, because the regular output of a warning signal will bring about a more careful behavior on the part of the user of the vehicle door.

The object of the invention is also an alternative method or device for the prevention of injuries or material damage caused by vehicle doors of stopping or parked vehicles, including at least one monitoring unit monitoring the external space, in particular the area next to and/or above the vehicle, and an evaluation unit for the data captured by the monitoring unit. If a fixed or variable threshold value (SW) detected by the evaluation unit is undershot or if the evaluation unit receives a signal for unlocking the locking mechanism of the vehicle door, an operating mode monitoring the outside door handle of the vehicle door is activated and a warning signal is output immediately a person and/or a corresponding device (preferably operated mechanically, electrically and/or by motor, particularly an electric motor) actuates and/or unlocks the external door handle of the vehicle door, even though in the monitored area of the monitoring unit an object, particularly an approaching object or an object fixed above the vehicle, is detected. In particular, cyclists, pedestrians or moving other vehicles are detected as approaching objects. Particularly roof girders, pipes routed along the ceiling or other elements that reduce the headroom are detected as fixed objects above the vehicle. The advantage of the aforementioned invention is that danger of injuries or material damage by the careless opening of a vehicle door by a person from the outside is clearly minimized because the regular output of a warning signal leads to a more careful behavior on the part of the user of the vehicle door.

In accordance with the invention, a threshold value (SW) relative to the speed of the vehicle is preferably provided. In this case, the door handle monitoring mode is activated if a vehicle speed is undershot, for example, at not less than 5 km/h, in particular at 8 km/h and preferably at 10 km/h. These speed values are based on experience in that people frequently get out of vehicles that are still rolling or braking in a careless manner. The speed signal itself can, for example, be derived from the tachometer of the vehicle or from a suitable monitoring unit, particularly if this is an image recognition unit.

As an alternative, or also in addition, to a speed-related threshold value (SW), a threshold value (SW) relative to acceleration is provided. In this case, it is proposed that the door handle monitoring mode be activated preferably relative to a detected vehicle deceleration.

Finally, it is also proposed to activate the door handle monitoring mode relative to a detected object distance. This is then particularly advantageous if the vehicle door to be opened is a tailgate, that for example, is being opened in an underground garage but is to be prevented from striking the ceiling or areas suspended from it. In accordance with this scenario, a monitoring unit, for example in the rear bumper, is arranged so that the exterior of the vehicle above the tailgate is detected with respect to fixed objects and if the distance is insufficient a warning signal is output. Obviously such protective measures are also conceivable for the hood of a vehicle, but would be rather academic.

In accordance with the invention, optical, acoustic and/or haptic warning signals are preferably output.

Suitable optical warning signals would be red flashing LED (light emitting diode) displays. A means of this kind to output an optical warning signal is preferably mounted on the vehicle door, for example, in the area and/or optical vicinity of the internal door handle, preferably equally visible from inside and outside. This can, for example, indicate by means of a steady green LED when no dangerous objects are detected.

Acoustic warning signals can be simple sound outputs such as an even continuous tone or intuitive signals such as that of a cycle bell or car horn or also perhaps a more convenient voice output such as "Warning: Bollard", "Building wall", "Caution: Cyclist", "Moving, or also parking, other vehicle", "Attention: Uneven ground", "Curbstone edge", "Puddle" or similar. A loudspeaker for sound outputs of this kind is preferably mounted in the roof lining, in the vehicle door itself or at some other suitable point in the vehicle, that can also be part of the vehicle music system. The latter case would advantageously enable the output of directional, or directed, sound signals as with stereo surround, e.g. as in the cinema.

Haptic means in accordance with the invention preferably delay opening of the vehicle door. For example, this would enable a door to be opened only on a second attempt, particularly if, to protect the occupants, the vehicle doors were automatically locked when the ignition was switched on, so that nobody can wrench a door open and threaten the occupants. As an alternative, or in addition, a first applied locking mechanism is also conceivable that for example is deactivated in conjunction with a confirmation mechanism, e.g. a button, arranged near to or on or in the handle. In every case, all doors are immediately unlocked in the event of an accident to enable external rescue.

In a further preferred embodiment of the invention, other traffic users or road users such as pedestrians, cyclists or drivers of other vehicles are also warned of the impending door opening or, in the event of a later approach, of an already open vehicle door, for example by means of the vehicle's own indicator lights and/or headlights or rear lights.

In accordance with the invention, a monitoring unit is preferred that has a monitoring area directed against the direction of travel, mounted in the external rear-view mirror and/or behind the rear window and/or in the rear light and/or in the front light and/or in the indicator light of the vehicle. Alternatively, or in addition, a monitoring unit with a monitoring area essentially directed in the direction of travel is mounted in the external rear-view mirror and/or behind the rear window and/or in the rear light and/or in the front light and/or in the indicator light of the vehicle. Finally, a monitoring unit with a monitoring area essentially directed vertically is mounted in the bumper, the mobile radio antenna or the radio antenna, or at some other suitable position in the vehicle. Such arrangements enable, in an advantageous manner, an at least partial to almost complete monitoring of the exterior of a vehicle. Units with 2D or 3D image recognition sensors such as mono, stereo and/or run-time cameras, ultrasound sensors, radar sensors, infrared sensors and/or many similar devices have proved suitable as monitoring units.

In accordance with the invention, the vehicle doors can preferably be unlocked and/or locked completely or partially mechanically and/or electrically and/or by means of motors, particularly electric motors, depending on the equipment of the vehicle and/or suitability. In particular, gullwing doors and sliding doors, trunk lids or tailgates are opened and closed electrically and automatically at the push of a button, by remote control or similar, for example, from the driver's seat.

This invention reduces the danger of accidents, injuries and/or material damage in an advantageous manner. It is suitable for implementation in an advantageous manner in already-known devices that assist the driver of a moving vehicle, such as those for lane detection or monitoring, blind-spot and lane changing, obstacle warning, pre-crash sensing, traffic sign recognition, parking, and so on.

Additional details and other advantages of the invention are described in the following with the aid of exemplary embodiments in conjunction with the accompanying drawings.

BRIEF DESCRIPTION OF THE DRAWINGS

FIG. 2 A vehicle with a monitoring unit that monitors the outside area above the vehicle.

DESCRIPTION OF THE PREFERRED EMBODIMENTS

Figure 1:
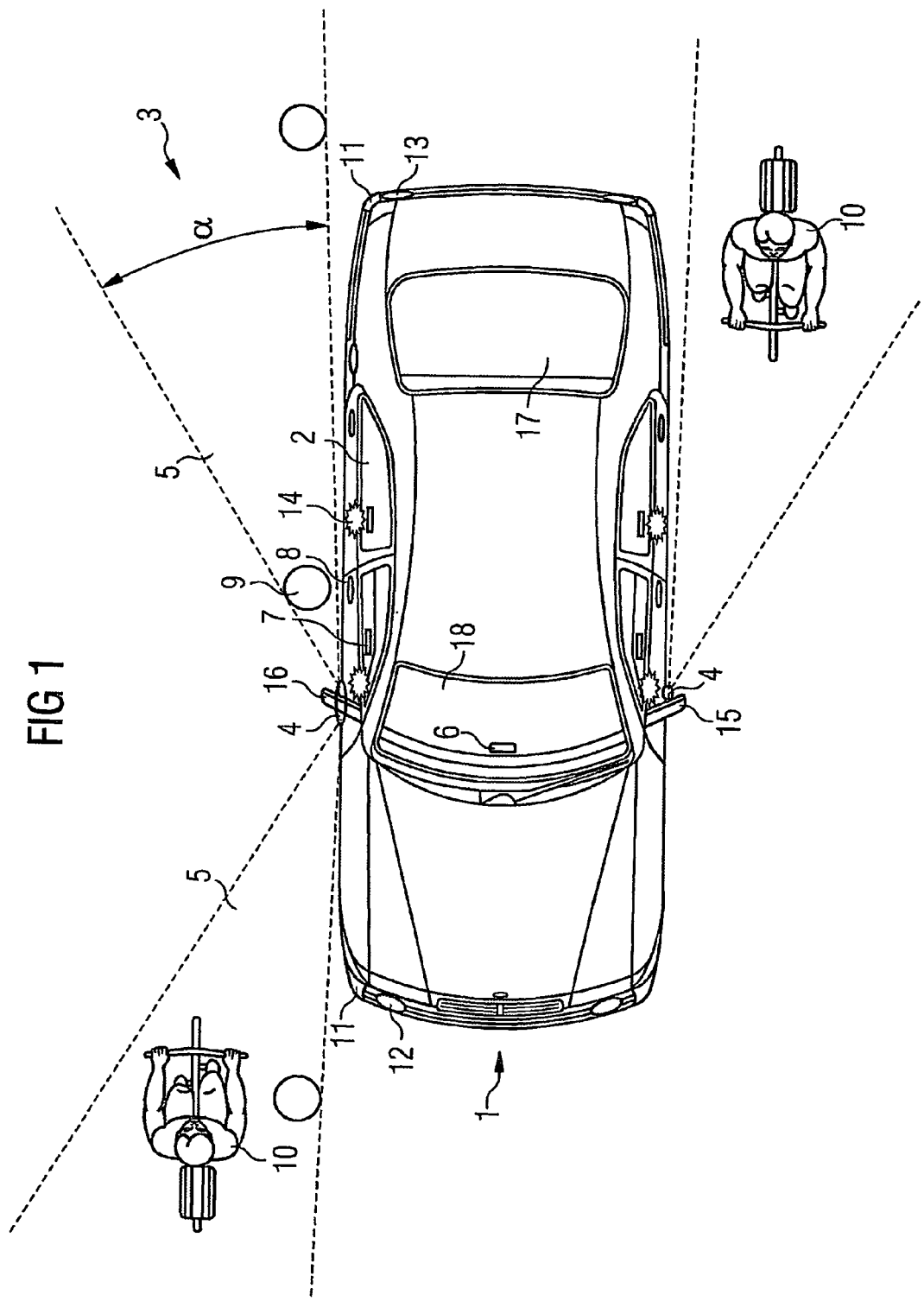
FIG. 1 A vehicle with a monitoring unit that externally monitors the side area of the vehicle.

FIG. 1 is a schematic view of a vehicle 1. This is fitted with at least one monitoring unit 4 monitoring the exterior 3. Units with 2D or 3D image recognition sensors such as mono, stereo and/or run-time cameras, ultrasound sensors, radar sensors, infrared sensors, and/or many other similar devices are suitable as the monitoring unit 4. The principle of the invention is explained in the following using an image recognition unit, that is preferably a camera. One or more evaluation units 6, for example, for the image data provided by the image detention unit 4, are preferably mounted at a central position, for example, in the vehicle tunnel of the vehicle 1 or at some other suitable place in the vehicle 1.

When the vehicle 1 is stopping, an operating mode monitoring the inner 7 and/or outer 8 door handle is activated and the exterior 3 of the vehicle 1 is monitored by a camera 4 if the evaluation unit 6 detects that a fixed or variable speed, acceleration and/or distance-dependent threshold value (SW) is undershot or if a signal unlocking the locking mechanism of the vehicle doors 2 is detected by the evaluation unit 6.

The sensor of the monitoring unit 4, a lens in the example of a camera, has an aperture angle a that defines a field of view 5 that extends both horizontally and vertically, and enables the monitoring of objects, obstacles or hazards located within that field of view. A fixed object, for example, a bollard 9, an approaching object, for example a cyclist 10, a pedestrian, a car (not illustrated) or similar is registered by the camera system 4, and the evaluation unit 6 then outputs an optical, acoustic and/or haptic warning signal, particularly immediately a door handle is actuated or unlocked from the inside 7 and/or from the outside 8.

This is advantageous in modern automobile designs, particularly in view of the increasing use of automatic electronic unlocking and locking systems. Thus accordingly, vehicle doors 2 that are increasingly in the form of tailgates can be electrically unlocked, for example from the driver's seat, and sometimes mechanically raised with the assistance of spring force and/or advantageously fixed in any position beyond a certain opening angle. If such automatic operations were to proceed without control, material damage would be difficult to avoid in many cases. The same applies, for example, to the automatic opening of a door assisted by electric motors, of vehicle doors 2 designed as sliding doors, particularly as these operations can be considerably more serious for third parties than the opening of a gullwing door. Furthermore, if particularly children but also some adults, tend to be occupants who jump from a vehicle 1 without taking care, personal injury is difficult to avoid without this invention, particularly if passing road users such as a cyclist 10 are not able to brake or take evasive action.

Red flashing LED displays 14 are, for example, suitable as optical warning signals. A means 14 of this kind for outputting an optical warning signal is preferably mounted on the vehicle door 2, for example in the spatial and/or optical vicinity of the internal door handle 7, and in particular is equally visible from inside and outside. If, however, no dangerous objects, 9, 10 etc are detected, this can, for example, be indicated by a steady green illuminated LED 14.

In accordance with the invention, a warning to other road users also preferably takes place particularly by means of the vehicle indicator lights 11 and/or headlights 12 or rear lights 13.

A camera 4 with a field of view 5 that is essentially directed against the direction of travel can be suitably mounted in the left 15 and right 16 external rear-view mirrors, or positioned behind the rear window 17, in the rear light 13, in the front light 12 (particularly in the side area thereof) and/or in the indicator light 11 of the vehicle 1.

A camera 4 with a field of view 5 that is essentially directed in the direction of travel can be suitably mounted in the left 15 and right 16 external rear-view mirrors, or positioned behind the front window 18, in the rear light 13, in the front light 12 and/or in the indicator light 11 (particularly in the side area thereof) of the vehicle 1.

FIG. 2 shows a vehicle 1 with a monitoring unit 4 monitoring the outside space 3 above it, in order to avoid damage to a tailgate-type vehicle door 2, particularly in an underground garage. A mode for monitoring the door handle 8 of the tailgate 2 is activated as described in FIG. 1. A monitoring unit 4 of this kind can, for example, be suitably mounted with a field of view 5 directed upward, for example vertically, on, in particular, the bumper 19 or the mobile radio antenna or radio antenna 20 of the vehicle 1.

The sensor, for example a lens, of the monitoring unit 4 has an aperture angle a that defines a field of view 5 that essentially extends vertically but can also extend horizontally, that allows the monitoring of objects, obstacles or hazards within it. Fixed obstacles in an underground garage, for example a supporting element 21 or a pipe secured to the ceiling 23 of the underground garage, are registered by the camera system 4, and the evaluation unit 6 then outputs an optical, acoustic and/or haptic warning signal, particularly immediately the door handle 8 of the tailgate 2 is actuated from outside or automatically unlocked.

This invention reduces, in an advantageous manner, the danger of accidents, material damage or injury. It is suitable for implementation in an advantageous manner in already-known devices that assist the driver of a moving vehicle 1, such as those for lane detection or monitoring, blind-spot and lane changing, obstacle warning, pre-crash sensing, traffic sign recognition, parking, and so on.

We claim:

1. A method for preventing injuries and material damage caused by a vehicle door of a stopped vehicle, which comprises the steps of:
   providing at least one monitoring unit monitoring an outside area;
   providing an evaluation unit receiving data from the monitoring unit, in an event of an undershoot of a fixed or variable threshold value being detected by the evaluation unit, or an unlocking signal to unlock a locking mechanism of the vehicle door being detected by the evaluation unit, the evaluation unit:
     activating a door handle monitoring mode for monitoring an inside door handle of the vehicle door; and
     initiating an output of a warning signal immediately upon an occupant and/or a corresponding device actuating and/or unlocking the inside door handle of the vehicle door, if a substantially stationary or approaching object being detected in a monitored area by the monitoring unit.

2. The method according to claim 1, which further comprises activating the door handle monitoring mode if a vehicle speed drops below a certain level.

3. The method according to claim 1, which further comprises activating the door handle monitoring mode relative to a detected vehicle deceleration.

4. The method according to claim 1, which further comprises activating the door handle monitoring mode relative to a detected distance to the object.

5. The method according to claim 1, which further comprises outputting an optical warning signal, an acoustic warning signal and/or a haptic warning signal as the warning signal.

6. The method according to claim 5, which further comprises:
providing a red flashing LED display in a case of a detected object; and
providing a steady green illuminated LED if the monitored area is free of objects.

7. The method according to claim 5, which further comprises outputting as the acoustic warning signal, a simple sound output selected from the group consisting of an even continuous tone, an intuitive signal, a cycle bell, a car horn and a voice message selected from the group consisting of a "Caution: Bollard" message, a "Building wall" message, a "Warning: Cyclist" message, an "Other vehicle moving or parked" message, an "Attention: Uneven ground" message, a "Curbstone edge" message, and a "Puddle" message.

8. The method according to claim 6, which further comprises providing the haptic warning signal, as a delayed opening signal of the vehicle door permitting the vehicle door to open only after a second attempt at opening the vehicle door is commenced.

9. The method according to claim 5, which further comprises forming the haptic warning signal to cause a locking mechanism for the vehicle door to only unlocked in conjunction with a confirmation mechanism.

10. The method according to claim 5, which further comprises providing a warning to other road users.

11. The method according to claim 1, which further comprises providing the monitoring unit with 2D or 3D image detection sensors selected from the group consisting of mono cameras, stereo cameras, run-time cameras, ultrasound sensors, radar sensors, and infrared sensors.

12. The method according to claim 1, which further comprises locking and unlocking the vehicle door mechanically, electrically and/or by motor, the vehicle door being selected from the group consisting of gullwing doors, standard doors, sliding doors, trunk lids, and tailgates and being opened and closed automatically, electrically at a push of a button and/or by remote control.

13. The method according to claim 1, which further comprises monitoring an area next to the vehicle.

14. The method according to claim 2, which further comprises activating the door handle monitoring mode if the vehicle speed drops below 5 km/h.

15. The method according to claim 2, which further comprises activating the door handle monitoring mode if the vehicle speed drops below 8 km/h.

16. The method according to claim 2, which further comprises activating the door handle monitoring mode if the vehicle speed drops below 10 km/h.

17. The method according to claim 10, which further comprises providing the warning to the other road users via vehicle indicator lights, headlights and/or rear lights.

18. A method for preventing injuries or material damage caused by a vehicle door of a stopped or parked vehicle, which comprises the steps of:
providing at least one monitoring unit monitoring an outside area;
providing an evaluation unit with data from the monitoring unit, in an event of an undershoot of a fixed or variable threshold value being detected by the evaluation unit or in the event of an unlocking signal to unlock a locking mechanism of the vehicle door being detected by the evaluation unit, the evaluation unit:
activating a door handle monitoring mode for monitoring an outside door handle of the vehicle door; and
initiating an output of a warning signal immediately after an occupant and/or a corresponding device actuates or unlocks the outside door handle of the vehicle door, if an approaching object or a fixed object above the vehicle being detected in a monitored area by the monitoring unit.

19. The method according to claim 18, which further comprises activating the door handle monitoring mode if a vehicle speed drops below a certain level.

20. The method according to claim 18, which further comprises activating the door handle monitoring mode relative to a detected vehicle deceleration.

21. The method according to claim 18, which further comprises activating the door handle monitoring mode relative to a detected distance to the object.

22. The method according to claim 18, which further comprises outputting an optical warning signal, an acoustic warning signal and/or a haptic warning signal as the warning signal.

23. The method according to claim 22, which further comprises:
providing a red flashing LED display in a case of a detected object; and
providing a steady green illuminated LED if the monitored area is free of objects.

24. The method according to claim 22, which further comprises outputting as the acoustic warning signal, a simple sound output selected from the group consisting of an even continuous tone, an intuitive signal, a cycle bell, a car horn and a voice message selected from the group consisting of a "Caution: Bollard" message, a "Building wall" message, a "Warning: Cyclist" message, an "Other vehicle moving or parked" message, an "Attention: Uneven ground" message, a "Curbstone edge" message, and a "Puddle" message.

25. The method according to claim 23, which further comprises providing the haptic warning signal, as a delayed opening signal of the vehicle door permitting the vehicle door to open only after a second attempt at opening the vehicle door is commenced.

26. The method according to claim 22, which further comprises forming the haptic warning signal to cause a locking mechanism for the vehicle door to only unlocked in conjunction with a confirmation mechanism.

27. The method according to claim 22, which further comprises providing a warning to other road users.

28. The method according to claim 18, which further comprises providing the monitoring unit with 2D or 3D image detection sensors selected from the group consisting of mono cameras, stereo cameras, run-time cameras, ultrasound sensors, radar sensors, and infrared sensors.

29. The method according to claim 18, which further comprises locking and unlocking the vehicle door mechanically, electrically and/or by motor, the vehicle door selected from the group consisting of gullwing doors, standard doors, sliding doors, trunk lids, and tailgates, and being opened and closed automatically, electrically at a push of a button and/or by remote control.

30. The method according to claim 18, which further comprises monitoring an area next to the vehicle and/or above the vehicle.

31. The method according to claim 19, which further comprises activating the door handle monitoring mode if the vehicle speed drops below 5 km/h.

32. The method according to claim 19, which further comprises activating the door handle monitoring mode if the vehicle speed drops below 8 km/h.

33. The method according to claim 19, which further comprises activating the door handle monitoring mode if the vehicle speed drops below 10 km/h.

34. The method according to claim 27, which further comprises providing the warning to the other road users via vehicle indicator lights, headlights and/or rear lights.

35. A device for preventing injuries and material damage caused by a vehicle door of a stopped vehicle, the device comprising:
at least one monitoring unit monitoring an exterior space;
an evaluation unit receiving data provided by said monitoring unit, said evaluation unit having:
means for detecting if a fixed or variable threshold value is undershot and/or for detecting receipt of a signal for unlocking a locking mechanism of the vehicle door; and
means for activating an operating mode for monitoring an inside door handle of the vehicle door; and
means for outputting a warning signal immediately upon an occupant and/or a corresponding device at actuating and/or unlocking the inside door handle of the vehicle door, if an sustantially fixed object or an approaching object is detected in a monitored area by said monitoring unit.

36. The device according to claim 35, wherein said means for outputting the warning signal outputs at least one signal selected from the group consisting of an optical signal, an acoustic signal and a haptic warning signal.

37. The device according to claim 35, wherein said means for outputting the warning signal is an optical means.

38. The device according to claim 36, further comprising a loudspeaker mounted in roof lining, in the vehicle door itself or at another suitable point in the vehicle, that can also be part of a vehicle music system.

39. The device according to claim 36, wherein said means for outputting the warning signal is a haptic means for delaying an opening of the vehicle door.

40. The device according to claim 36, further comprising:
a confirmation mechanism; and
means for locking the vehicle door and being deactivated in conjunction with activation of said confirmation mechanism.

41. The device according to claim 35, further comprising means for enabling other road users to be warned.

42. The device according to claim 35, wherein said monitored area is directed substantially against a direction of travel and said monitoring unit is mounted in at least one of an external rear-view mirror, behind a rear window, in a rear light, in a front light and/or in an indicator light of the vehicle.

43. The device according to claim 35, wherein said monitored area is directed substantially in a direction of travel and said monitoring unit is mounted in at least one of a external rear-view mirror, behind a front windshield, in a front light, in a rear light and/or in an indicator light of the vehicle.

44. The device according to claim 35, wherein said monitored area is directed substantially upward, and said monitoring unit is mounted in a bumper, in a mobile radio antenna, a radio antenna, and behind a rear window.

45. The device according to claim 35, wherein said monitoring unit has 2D or 3D image detection sensors selected from the group consisting of mono cameras, stereo cameras, run-time cameras, ultrasound sensors, radar sensors, and infrared sensors.

46. The device according to claim 35, wherein the vehicle door can be locked and/or unlocked mechanically, electrically and/or by a motor.

47. The device according to claim 35, wherein said monitoring units monitors the exterior space next to the vehicle.

48. The device according to claim 37, wherein said optical means is an LED display outputting the warning signal, and is disposed at the vehicle door.

49. The device according to claim 48, wherein said LED display is disposed in a spatial and/or optical vicinity of the inside door handle, so that said LED display is equally easily seen from inside and outside of the vehicle.

50. The device according to claim 39, wherein said haptic means delays an opening of the vehicle door until a second attempt is made to open the vehicle door.

51. The device according to claim 40, wherein said confirmation mechanism is a button integrated or mounted near, on, or in the inside door handle.

52. The device according to claim 41, wherein said means for enabling other road users to be warned is selected from the group consisting of vehicle indicator lights, headlights and rear lights.

53. The device according to claim 46, wherein the vehicle door can be locked and/or unlocked automatically by a press of a button or a remote control device.

54. A device for preventing injuries or material damage caused by a vehicle door of a stopped or parked vehicle, the device comprising:
at least one monitoring unit monitoring an external space;
an evaluation unit receiving data provided by said monitoring unit, said evaluation unit containing:
means for detecting if a fixed or variable threshold value is undershot and/or for detecting receipt of a signal for unlocking a locking mechanism of the vehicle door; and
means for activating an operating mode monitoring an outside door handle of the vehicle door; and
means for outputting a warning signal immediately upon a person and/or a corresponding device actuating and/or unlocking the outside door handle of the vehicle door, if an approaching or fixed object above the vehicle is detected in a monitored area by said monitoring unit.

55. The device according to claim 54, wherein said means for outputting the warning signal outputs at least one signal selected from the group consisting of an optical signal, an acoustic signal and a haptic warning signal.

56. The device according to claim 54, wherein said means for outputting the warning signal is an optical means.

57. The device according to claim 55, further comprising a loudspeaker mounted in roof lining, in the vehicle door itself or at another suitable point in the vehicle, that can also be part of a vehicle music system.

58. The device according to claim 55, wherein said means for outputting the warning signal is a haptic means for delaying an opening of the vehicle door.

59. The device according to claim 55, further comprising:
a confirmation mechanism; and
means for locking the vehicle door being deactivated in conjunction with activation of said confirmation mechanism.

60. The device according to claim 54, further comprising means for enabling other road users to be warned.

61. The device according to claim 54, wherein said monitoring unit monitors the monitored area directed substantially against a direction of travel and is mounted in at least one of an external rear-view mirror, behind a rear window, in a rear light, in a front light and/or in an indicator light of the vehicle.

62. The device according to claim 54, wherein said monitoring unit monitors the monitored area directed substantially in a direction of travel and is mounted in at least one of a external rear-view mirror, behind a front windshield, in a front light, in a rear light and/or in an indicator light of the vehicle.

63. The device according to claim 54, wherein said monitoring unit monitors the monitored area directed substantially upward, and is mounted in a bumper, in a mobile radio antenna, a radio antenna, and behind a rear window.

64. The device according to claim 54, wherein said monitoring unit has 2D or 3D image detection sensors selected from the group consisting of mono cameras, stereo cameras, run-time cameras, ultrasound sensors, radar sensors, and infrared sensors.

65. The device according to claim 54, wherein the vehicle door can be locked and/or unlocked mechanically, electrically and/or by a motor.

66. The device according to claim 54, wherein said monitoring unit monitors the exterior space next to and/or above the vehicle.

67. The device according to claim 56, wherein said optical means is an LED display outputting a warning signal, and is disposed at the vehicle door.

68. The device according to claim 67, wherein said LED display is disposed in a spatial and/or optical vicinity of the inside door handle, so that said LED display is equally easily seen from inside and outside of the vehicle.

69. The device according to claim 58, wherein said haptic means delays an opening of the vehicle door until a second attempt is made to open the vehicle door.

70. The device according to claim 59, wherein said confirmation mechanism is a button integrated or mounted near, on, or in the inside door handle.

71. The device according to claim 60, wherein said means for enabling other road users to be warned is selected from the group consisting of vehicle indicator lights, headlights and rear lights.

72. The device according to claim 65, wherein the vehicle door can be locked and/or unlocked automatically by a press of a button or a remote control device.

* * * * *